United States Patent [19]

Oshikoshi et al.

[11] Patent Number: 4,745,442

[45] Date of Patent: May 17, 1988

[54] INSTANT PHOTOGRAPHIC METHOD AND APPARATUS

[75] Inventors: Yuji Oshikoshi, Tokyo; Masashi Katoh; Hisashi Kikuchi, both of Kanagawa, all of Japan

[73] Assignee: Fuji Photo Film Co., Ltd., Kanagawa, Japan

[21] Appl. No.: 572

[22] Filed: Dec. 31, 1986

Related U.S. Application Data

[62] Division of Ser. No. 808,277, Dec. 12, 1985, Pat. No. 4,677,046.

[30] Foreign Application Priority Data

Dec. 12, 1984 [JP] Japan ................. 59-262226
Dec. 12, 1984 [JP] Japan ................. 59-262227
Dec. 12, 1984 [JP] Japan ................. 59-262228
Jan. 28, 1985 [JP] Japan ................. 60-12674
Jan. 28, 1985 [JP] Japan ................. 60-12675

[51] Int. Cl.$^4$ .................. G03B 29/00; G03B 27/30
[52] U.S. Cl. .......................... 355/28; 355/29; 355/107
[58] Field of Search .................. 355/27, 28, 29, 107

[56] References Cited

U.S. PATENT DOCUMENTS

| | | | |
|---|---|---|---|
| 3,182,578 | 5/1965 | Limberger | 355/107 |
| 3,307,464 | 3/1967 | Gold, et al. | 355/107 |
| 4,447,146 | 5/1984 | Kogane et al. | 355/28 |

Primary Examiner—Monroe H. Hayes
Attorney, Agent, or Firm—Young & Thompson

[57] ABSTRACT

An instant photographic apparatus uses a photosensitive member in the form of a roll, of a length to receive a plurality of exposures, and an image-receiving member in the form of either a roll or a sheet. The photosensitive member is cut off to the length of a single frame of film after the exposure of its leading end. Before or after cutting off the member or members, the exposed leading end of the photosensitive member and the image-receiving member are superposed. Between the superposed members a processing liquid is distributed and spread in a uniform layer for diffusion transfer processing. During the processing, negative and positive images are produced simultaneously on the photosensitive and image-receiving members, respectively, according to the latent image previously created on the photosensitive member by exposure.

19 Claims, 9 Drawing Sheets

INSTANT PHOTOGRAPHIC METHOD AND APPARATUS

This is a division of application Ser. No. 808,277, filed Dec. 12, 1985, now U.S. Pat. No. 4,677,046.

BACKGROUND OF THE INVENTION

The present invention relates to an instant photographic apparatus which uses a peel-apart type instant film comprising separate photosensitive and image-receiving sheets which are peeled apart from each other after diffusion transfer processing. The instant photographic apparatus according to the present invention can be advantageously applicable to photographic apparatus for commercial use, such as coin-operated photographic apparatus for identification photos, driver's license photos and the like, studio photographic apparatus and image-recording apparatus in OA machines such as analog or digital copying machines, CRT display photographic devices, LCD display photographic devices and the like, such apparatus consuming a large number of instant films.

Instant photographic apparatus for use with a peel-apart type instant film unit (which is hereinafter referred to as a film unit) are well known in the art of instant photography. The film units comprise photosensitive sheets for forming a latent image thereon and image-receiving sheets for forming a reversed image corresponding to the latent image formed on the photosensitive sheet by diffusion transfer processing. These sheets are contained in a film cassette or film pack in stacked relation on both sides of a pressure plate disposed in the film pack. After exposing the foremost of the film units loaded in a camera, a tab attached to the photosensitive sheet is withdrawn from the camera to force the exposed photosensitive sheet to be turned through 180° about the pressure plate while being withdrawn. As a consequence, the forward parts of the respective sheets are brought into close contact with each other when leaving the camera. At this time, the tab is detached from the photosensitive sheet.

The film unit is then continuously withdrawn from the camera by pulling on the contacting forward ends so as to advance the film unit between a pair of pressure-applying rollers in superposed relation. At the beginning of the advancement of the film unit, the pressure-applying rollers apply pressure to a pod containing a processing liquid to rupture it so as to release the processing liquid. The pressure-applying rollers distribute the processing liquid between the superposed sheets as the sheets are advanced therebetween, spreading the processing liquid in a thin and uniform layer.

During the processing, transfer negative and positive images are produced on the photosensitive and image-receiving sheets simultaneously by means of diffusion transfer.

Because the film packs used heretofore contain at most ten such film units as described above, it is essential to frequently replenish new film packs in such instant photographic apparatus for commercial use, such as coin-operated photographic apparatus for identification photos, driver's license photos, studio photographic apparatus, and image recording devices in OA machines and the like, which consume a large number of film units. A problem in these commercial devices is that the frequent replenishment of film packs complicates the photographic procedure.

On the other hand, the photosensitive sheet has a withdrawing sheet with a tab and the image-receiving sheet has a carrying sheet for ensuring the withdrawl of film units from the film pack one by one. This construction of the film unit increases the manufacturing cost of the film unit itself, of the film pack and of the assembly thereof. This ultimately results in an increased cost of instant prints.

OBJECTS OF THE INVENTION

It is therefore a first object of the present invention to provide an instant photographic apparatus which is suitable for taking a large number of photos.

It is another object of the prevent invention to provide an instant photographic apparatus which allows a substantial decrease in the frequency of replenishing film units, thereby realizing easy maintenance.

It is still another object of the present invention to provide an instant photographic apparatus which can use an instant film of simplified structure.

It is a further object of the present invention to provide an instant photographic apparatus which can provide low cost instant prints, thanks to the simplified structure of the instant film and the ease of maintenance.

A still further object of the present invention is to provide an instant photographic apparatus in which there is no slippage between the superposed photosensitive and image-receiving members during processing, thereby producing an image without any blurring on the image-receiving member and the placement of an image in the desired position on the image receiving member.

SUMMARY OF THE INVENTION

To achieve the above-mentioned objects, there are provided, in accordance with the present invention, a photosensitive member on which latent images are formed and an image-receiving member. On these members, negative and positive images corresponding to the latent image are produced simultaneously during processing, by means of diffusion transfer. The two members, which are loaded in a camera housing separately, are superposed relative to each other by passing them between pressure applying rollers which rupture the pod of processing liquid so as to distribrute and spread the processing liquid in an even layer between the superposed members.

In a desirable embodiment according to the present invention, the photosensitive and image-receiving members, each being in the form of rolls, are cut to form a length of one frame either before or after superposition, so as to provide a film unit.

The image-receiving member is provided with a plurality of pods of processing liquid attached thereto at regular intervals. The provision of the pods makes it difficult to roll up the image-receiving member in even convolutions and so provides many chances to rupture the pods accidentally when rolling up the image-receiving member tightly. On the other hand, the photosensitive member, which has a thin uniform layer of diffusion transfer material on one surface of its base, can be rolled up with even convolutions.

In view of the above, it is desirable to use the photosensitive member in the form of a roll, as also the image-receiving sheets. The part of the photosensitive member which has been exposed is cut off from the rolled photosensitive member so as to form an exposed negative sheet which is superposed on the image-receiving sheet.

The superposed photosensitive and image-receiving sheets are pulled between pressure-applying rollers or processing rollers for spreading a processing liquid therebetween. At this time, however, there is a possibility of relative movement between the superposed sheets. In the event of the relative movement between the sheets, a blurred image will be produced on the image-receiving sheet and the image will likely be out of position on the image-receiving sheet.

Such problems can be solved by connecting the loading end of the photosensitive sheet to the image-receiving sheet and then pulling them between the pressure-applying rollers.

According to the present invention, the photosensitive member is in the form of a roll, and the image-receiving member is in the form of a roll or sheets, which are cut to form sheets after exposure. The use of the photosensitive and image-receiving members in the form of rolls eliminates the need to change film packs frequently, thereby to provide very easy photographic operations. Therefore, since the instant photographic method and apparatus according to the present invention is suitable for use when a large number of photos are taken, especially successively, it is advantageously applicable to such apparatus as coinoperated automatic photographic apparatus in which it is costly to providing servicing. Furthermore, according to the present invention, there is no need to provide any structure for withdrawing film sheets or units from a film pack, because no film pack is used. As a result, the cost of each print is significantly decreased. In addition to the above, according to the present invention, the photosensitive and image-receiving members are pulled between the pressure-applying rollers for processing after superposing them relative to each other, and so there is no relative movement therebetween during processing.

BRIEF DESCRIPTION OF THE DRAWINGS

The above and other objects and features of the present invention will become more apparent to those skilled in the art from the following detailed description with reference to the accompanying drawings, in which.

DETAILED DESCRIPTION OF THE INVENTION

Figure 1:
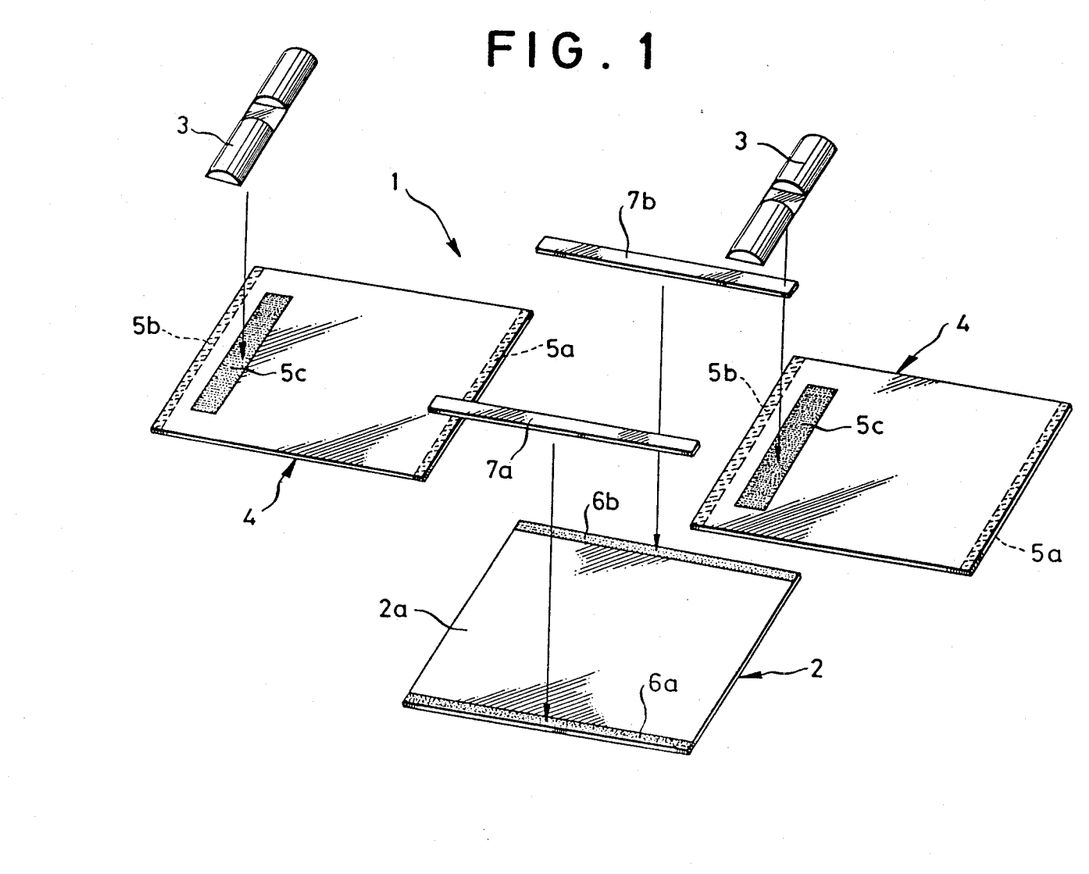
FIG. 1 is an exploded perspective view of an image-receiving member used in the present invention.

Referring now to FIG. 1, shown therein is an image-receiving member 1, which comprises a large number of image-receiving sheets 2 connected with coupling sheets 4 in alternate arrangement. Each image-receiving sheet 2 has on its upper surface an image-forming emulsion layer 2a on which a positive image is produced during processing by means of diffusion transfer.

For connecting the image-receiving sheet 2 and coupling sheet 4 to each other, there is provided on the underside at each end of the coupling sheet 4 an adhesive material layer 5a, 5b of a weak bonding strength. The adhesive material layer 5a, 5b can bond the sheets 2 and 4 to each other at their ends by heating. However, the bonded sheets 2, 4 can be easily separated from each other by pulling either one of them. On the forward part of the coupling sheet 4 there is a pod 3 of processing liquid attached thereto through an adhesive material layer 5c by heating. Along the side margins of the image-receiving sheet 2, longitudinal mask members 7a, 7b are connected to, but easily separable from, the image-receiving sheet 2 by adhesive layer 6a, 6b of a weak bonding strength also by heating. The mask members 7a, 7b serve to spread the processing liquid from the ruptured pod 3 in a uniform layer. The mask members 7a, 7b can be provided with the adhesive material layers instead of the adhesive material layers 6a, 6b.

Figure 2:
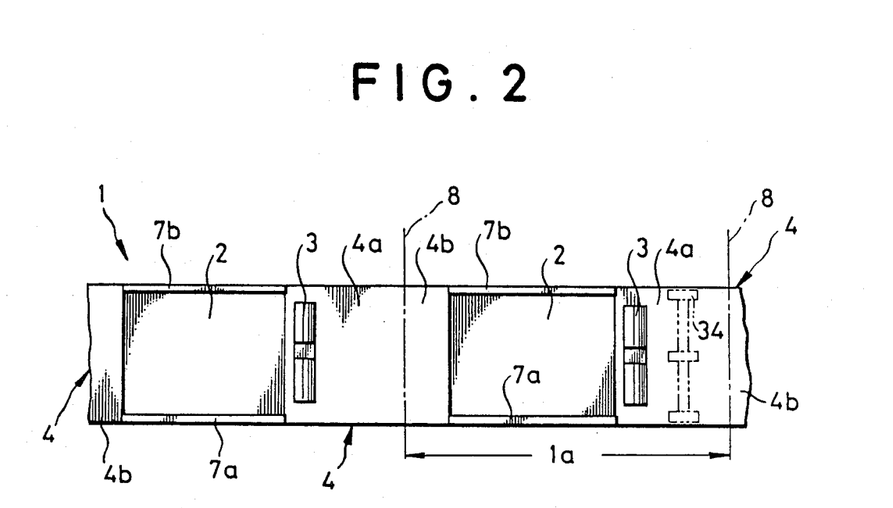
FIG. 2 is a plan view of the image-receiving member of FIG. 1.

As shown in FIG. 2, the image-receiving member 1 comprises a plurality of the image-receiving and coupling sheets 2, 4 which are connected to one another in an alternate arrangement so as to provide a series of images at regular intervals. Usually, the web-like image-receiving member 1 is prepared in the form of rolls for convenience of storage and loading. A roll of the image-receiving member 1 loaded in a photographic apparatus is withdrawn frame by frame to be cut along the phantom line 8 to a certain length of sheets, whereby the coupling sheet 4 is divided into two parts, namely, a withdrawing section 4a including the pod 3 of processing liquid, and a skirt or trailing section 4b which in turn serves as trap means for the excess processing liquid.

Figure 3:
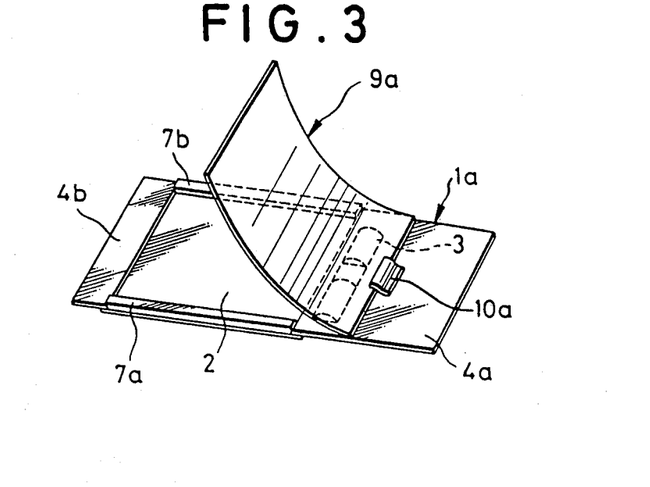
FIG. 3 is a perspective view of the photosensitive and image-receiving members partly superposed relative to each other.

Referring now to FIG. 3, the image-receiving sheet member 1a cut from the roll of the image-receiving member 1 is partly superposed on the exposed part of the photosensitive member 9, namely the photosensitive sheet member 9a. After the superposition, the superposed image-receiving sheet 1a and the photosensitive sheets 9a are, as in the conventional type of instant film units, pulled between a pair of processing rollers or pressure-applying rollers for distributing and spreading a processing liquid therebetween. During the processing, in the event the superposed sheets move or slip relative to each other, the image to be produced on the image-receiving sheet 2 will blur and/or lose its proper location as described hereinbefore. To prevent this, the superposed sheet members 1a, 9a are secured together with a piece of adhesive tape 10a.

It should be noted that the structures of the emulsion layers of the image-receiving and photosensitive members 1, 9, the processing liquid and the pod 3 for the processing liquid may all be the same as in various kinds of instant films now on the market in all the countries of the world.

Figure 4:
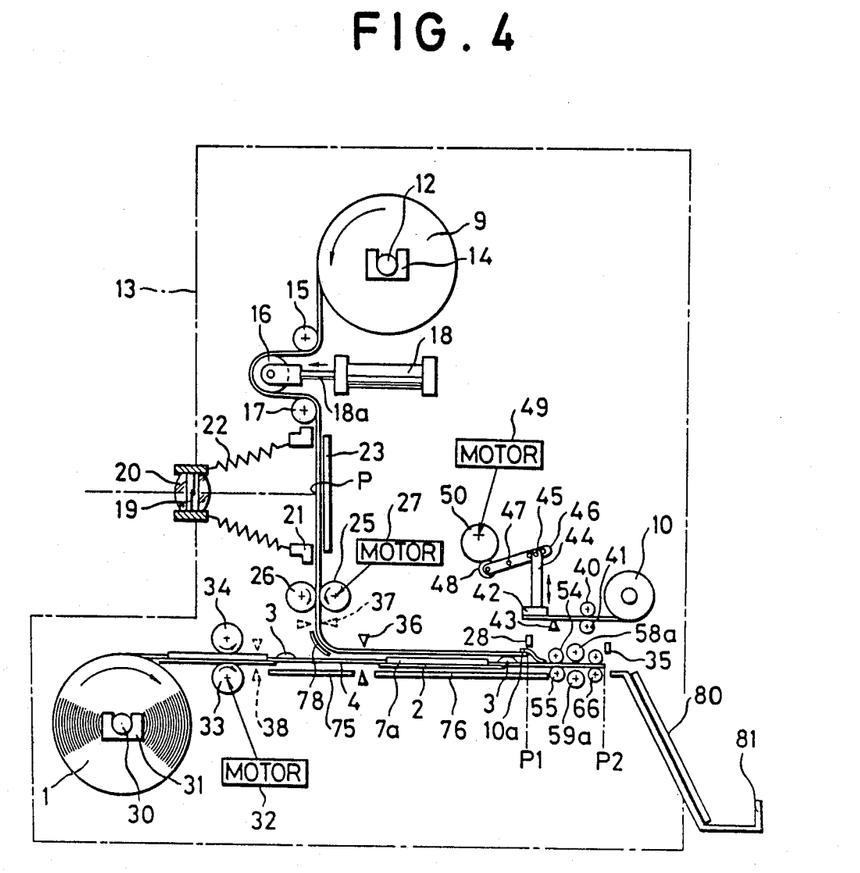
FIG. 4 is a schematic sectional view of an embodiment of the instant photographic apparatus according to the present invention.

Referring now to FIG. 4, shown therein is an instant photographic apparatus for use in practicing the method according to the present invention, in which a camera housing 13 at its upper section is provided with a holder 14 detachably mounting a core rod 12 on which the above-mentioned web-like photosensitive member 9 is rolled. Within the camera housing 13, there is a frame member 21 at an exposure position P in front of which a taking lens 20 with a between-the-lens shutter 19 is fixed so as to create a latent image of the photosensitive member 9 in the exposure position during exposure. Behind the exposure frame 21 there is a flat plate 23, which is a pressure plate, for maintaining the forward parts of the photosensitive member 9 flat thereon. Between the taking lens 20 and the exposure frame 21 a bellows 22 is provided to exclude undesirable ambient light.

Below the exposure frame 21 there is a pair of rotatable rollers 25, 26 driven by means of a motor 27 to advance the photosensitive member 9 by a predetermined length until the leading end of the photosensitive member 9 is detected by means of a photosensor 28 at a first detection position P1. The photosensor 28 is adapted to emit light to which the photosensitive member is insensitive but which the photosensitive member reflects, and to detect the thus-reflected light.

Between guide rollers 15, 17, a retracting roller 16 is disposed, which is rotatably mounted on the end of a piston rod 18a of an air cylinder 18 for horizontal movement in order to pull the leading end of the photosensitive member 9 which extends beyond the forwarding rollers 25, 26, back to the forwarding rollers 25, 26 after the exposed forward portion has been cut off. The provision of the retracting roller 16 makes it possible to use as much as possible of the photosensitive members.

At the lower section of the camera housing 13 there is a holder 31 for detachably mounting a core rod 30 on which the above-mentioned web-like image-receiving member 1 is rolled. The image-receiving member 1 is forwarded toward a second detection position P2 by means of a pair of rollers 33, 34 driven by a motor 32. Each of the forwarding rollers 33, 34 as shown in FIG. 2, comprises three narrow wheels coaxially mounted on a common shaft, the wheels being positioned to miss the parts of the pods 53 containing the processing liquid, so as not to rupture the pods 3 when advancing the image-receiving member 1.

When the photosensitive member 9 is superposed on the image-receiving member 1, a piece of adhesive tape 10a is used to secure them relative to each other. Then, these members 1, 9 are cut off by means of a cutter 36 to form an exposed photosensitive sheet member 9a and an image-receiving sheet member 1a, as shown in FIG. 3. The cutter 36 may be replaced by two pairs of cutters 37, 38 downstream of the forwarding rollers 25, 26 and 33, 34 for the respective members.

The use of a piece of adhesive tape 10a has the purpose of eliminating relative movement or slippage between the superposed sheet members 1a, 9a when pulling the superposed sheet members 1a, 9a between the pressure-applying rollers for processing so as to produce an image without blur on the image-receiving sheet 2.

The adhesive tape piece 10a is provided in such a way that the forward end of a roll of adhesive tape 10 is withdrawn and then cut off to a certain length. Specifically, a certain length of adhesive tape 10 which is withdrawn by means of a pair of feed rollers or toothed rollers 40, 41, and is held by means of a push plate 42 by suction, the push plate 42 being connected to a sliding rod 44 for vertical movement. Therefore, the part of the adhesive tape 10 held by the push plate 42 can be cut off by means of a cutter 43 upon downward movement of the sliding rod 44. The adhesive tape piece 10a thus cut off is pressed against the superposed photosensitive and image-receiving members 9, 1 to connect them to each other. After this, the push plate 42 releases the adhesive tape piece 1a and retracts upwardly.

The sliding lever 44 to which the push plate 42 is connected as its lower end is slidably supported by guide means (not shown) for vertical movement. For causing the vertical movement of the sliding lever 44, there is provided an eccentric cam member 50 the periphery of which is contacted with a contact roller 48 on one end of a rocking lever 46 pivotally mounted on a shaft 47 at its midportion. The sliding lever 44 at its upper end is coupled to the opposite end of the rocking lever 46 by means of a pin 45. Therefore, the sliding lever performs a vertical movement between its upper and lower positions at every turn of the cam member 50 which is rotated by a motor 49.

Figure 5:
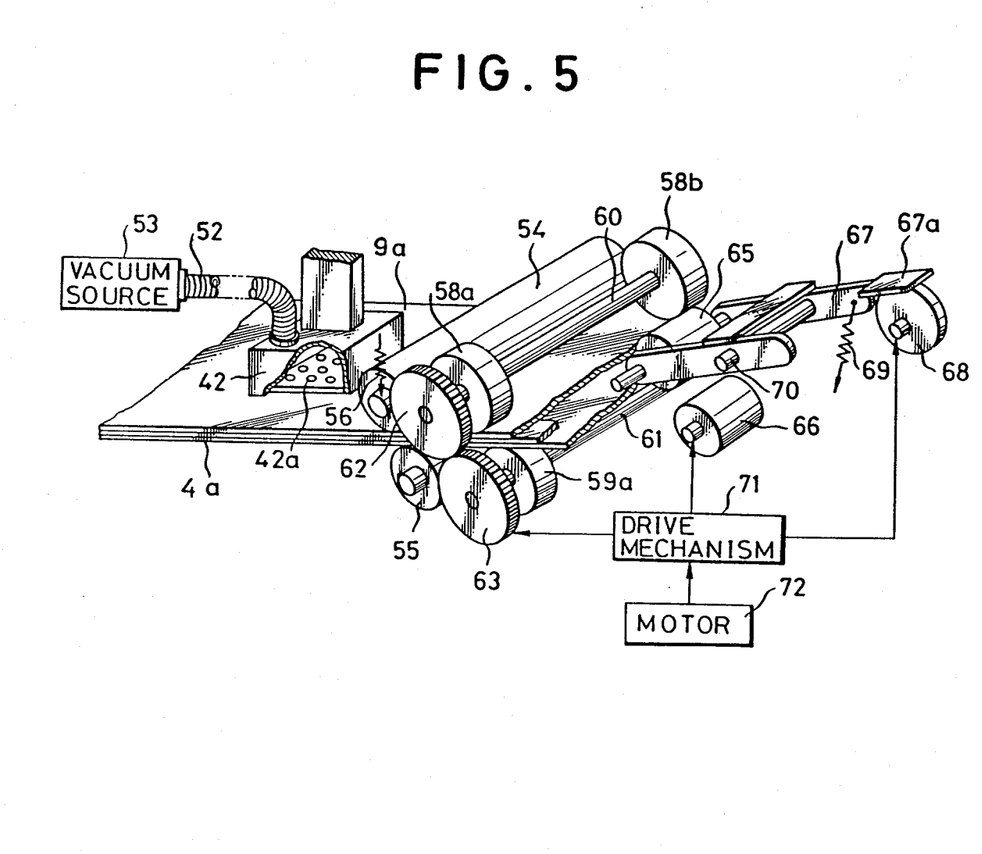
FIG. 5 is a perspective view showing a withdrawing mechanism.

As shown in detail in FIG. 5, the push plate 42, which forms the bottom of a suction box, is formed with a number of suction holes 42a. The suction box is connected to a vacuum source 53 through a flexible pipe 52 for producing a negative pressure in the suction box.

Downstream of the suction means provided by the push plate 42, there is disposed a pair of pressure applying rollers 54, 55 between which the superposed photosensitive and image-receiving sheet members 9a, 1a in close contact are pulled to rupture the pods 3. For applying pressure, one of the rollers 54, 55, for instance the upper roller 54, is biased by a spring 56.

Downstream of the pressure-applying rollers 54, 55 is a pair of disk-like transporting rollers 58a, 58b fixedly supported at the ends of a shaft 60 and a pair of disk-like transporting rollers 59a, 59b supported at the ends of a shaft 61 juxtaposed to the transporting rollers 58a, 58b. These disk-like transporting rollers 58a, 58b and 59a, 59b, which are rotated at the same rate through gears 62, 63 engaging with each other, transport the superposed sheet members 1a, 9a by gripping longitudinal mask members 7a, 7b therebetween in order to prevent marking. The rotation of the gear 63 is caused by a motor 72 through a drive mechanism 71 well known in the art.

Because high pressure is applied to the superposed sheet members 1a, 9a to rupture the pod 3 by means of the pressure-applying rollers 54, 55, the superposed sheet members 1a, 9a must be withdrawn with considerable tensile force. Thereupon, the superposed sheet members 1a, 9a are apt to slip between the disk-like transporting rollers 58a, 59a and 58b, 59b. To avoid such slippage, there is provided a pair of withdrawing rollers 65, 66 downstream of the transporting rollers so as to seize the forward end of the image-receiving sheet member 1a at the beginning of the withdrawal and then to withdraw the same to a certain extent. If the withdrawing rollers 65, 66 are in contact with the superposed sheet members 1a, 9a until after the pod 3 has passed between the pressure-applying rollers 54, 55, there will be produced marks on the image-receiving sheet 2. For this reason, the withdrawing roller 65 is adpated to be disengaged from the image-receiving sheet member 1a before the image-receiving sheet 2 arrives. This disconnection of the withdrawing roller 65 is effected by means of a locking arm 67 on one end of which the withdrawing roller 65 is rotatable mounted. The lock arm 67 is rotated counterclockwise about an axis 70 when the end portion 67a is pushed up against a spring 69 by means of a cam member 68.

In the above-described apparatus, the transporting rollers 58a, 58b, 59a and 59b, the withdrawing roller 66 and the cam member 68 are connected to and driven by the motor 72 through a drive mechanism 71 as shown in block diagram form in FIG. 5. The motors 27, 32, 49 and 72, the air cylinder 18 and the shutter 19 are sequentially caused to operate under the control of a microcomputer (not shown) built in the apparatus, upon operating the start key.

The sequential operation of the instant photographic apparatus according to the first embodiment of the present invention will now be described hereinunder.

After having loaded the web-like photosensitive member 9 rolled on the core rod 12 by mounting the same on the holder 14, the leading end of the photosensitive member 9 is withdrawn and nipped between the forwarding rollers 25, 26. On the other hand, after having loaded the web-like image-receiving member 1 rolled on the core 30 by mounting the core rod 30 on the holder 31, the leading end thereof is withdrawn and nipped between the forwarding rollers 33, 34.

For taking the picture of a subject disposed in front of the taking lens 20, a start button (not shown) is operated to cause the operation of the shutter 19 so as to create a latent image of the subject on the forepart of the photosensitive member 9 in the exposure station P. After the operation of the shutter has ended, the motor 32 starts to rotate, causing the rotation of the forwarding rollers 33, 34 between which the image-receiving member 1 is nipped, so that the image-receiving member 1 is forwarded through the position P2.

When the forward end of the image-receiving member 1 is detected by a photosensor 35, the motor 32 is stopped. During the forward movement of the image-receiving member 1, the motor 72 is started to rotate to cause the rotation of the rollers 65, 66, so as to advance the image-receiving member 1 until the pods 3 pass between the pressure-applying rollers 54, 55. Following the passage of the pods 3 between the pressure-applying rollers 54, 55, the motor 72 is stopped.

On the other hand, when the forward end of the image-receiving member 1 reaches the detection position P2, the motor 27 is started to rotate, causing the rotation of the forwarding rollers 25, 26, thereby to advance a certain length of the forepart of the photosensitive member 9. The forward end of the photosensitive member 9 is, after being guided by a curved guide plate 78, moved onto and along the upper surface of the image-receiving member 1. The motor 27 is also stopped when the forward end of the photosensitive member 9 is detected by the photosensor 28.

When the photosensitive member 9 is superposed properly on the image-receiving member 1, the rollers 40, 41 are caused to rotate so as to feed a certain length of the adhesive tape 10, which in turn is held by the push plate 42 by suction. Then the motor 49 is started to rotate so as to effect one revolution of the cam member 50, causing the sliding lever 44 to perform one reciprocating motion. During the down movement of the sliding lever 44, the adhesive tape 10 held by the push plate 42 is cut off by the cutter 43 to provide an adhesive tape piece 10a of a certain length. At its lowermost position, the sliding lever 44 and hence the push plate 42 force the adhesive tape piece 10a against the end of the photosensitive member 9 and a part of the image-receiving member 1, thereby connecting these members to each other.

Just after the connection of the two superposed members, a valve (not shown) of the vacuum source 53 is changed over to place the inside of the holding box including the push plate 42 in communication with the atmosphere, thus releasing the adhesive tape piece 10a. After this, the sliding lever 44 retracts upwardly to its initial position. The connected and superposed image-receiving and photosensitive members 1, 9 confine the pod 3 therebetween.

Successively, the cutter 36 is actuated to cut the superposed members so as to form a photosensitive sheet member 9a and an image-receiving sheet member 1a which are connected to and superposed on each other. After having formed the sheet members 1a, 9a, the motor 72 is restarted to rotate, causing the rotation of the nip rollers 65, 66 so as to withdraw the image-receiving sheet member 1a. Concurrently, side rollers 58a, 58b and 59a, 59b, which nip the longitudinal sides of the superposed sheet members 1a, 9a, withdraw the superposed sheet members as a unit. During the withdrawal, the pod 3 is ruptured by means of the pressure-applying rollers 54, 55 to release the processing liquid therefrom which in turn is distributed between the superposed sheet members 1a, 9a. As the superposed sheet members 1a, 9a are transported passing between the pressure applying rollers 54, 55, the processing liquid is spread in a uniform layer therebetween. The excess of the processing liquid is trapped between the trailing end portion of the photosensitive sheet member 9a and the trapping section 4b provided at the end of the image-receiving sheet member 1a.

After the pods 3 have been ruptured, the cam member 68 is controllably rotated so as to swing the arm 67 in the clockwise direction about the shaft 70, thereby moving and keeping the withdrawing roller 65 secured to the end of the arm 67 away from the photosensitive sheet member 9a. Meanwhile, the side rollers 58a, 58b and 59a, 59b are continuously rotated so as to withdraw the superposed sheet members 1a, 9a, thereby delivering them as an instant film unit 80 into a tray 81. As is well known in the art of instant photography, upon the withdrawal of the instant film unit 80 from the apparatus, the diffusion transfer process takes place outside the apparatus in several tens of seconds, for example 60 seconds. After the lapse of this time period, the sheet members 1a, 9a of the film unit 80 are peeled apart from each other to provide a desired reverse image on the image receiving sheet member 1a.

After the photosensitive member 9 has been cut off by the cutter 36, the air cylinder 18 is actuated to advance the piston 18a so as to pull the photosensitive member 9 back. Consequently, the forward end of the remaining photosensitive member 9 at the cutter is pulled back to the forwarding rollers 25, 26. This helps to conserve the expensive photosensitive member 9.

A subsequent photographic operation, which is started by the operation of the start button, is effected in the same sequence as described above.

It is well known in the art of instant photography to heat the instant film unit 80 to a temperature of about 25°–30° C. during development. The film unit 80 thus heated can provide a desired print finished with a uniform quality thereover. For this reason, it is desirable to heat the instant film unit 80 for a certain time within the camera housing 13.

It is also well known in the art of instant photography to provide either a black opaque paper base or a black opaque layer in an instant film unit in order to enable processing the exposed instant film unit in the daylight without light fog. If a black opaque paper base or black opaque layer is omitted, the cost of the instant film unit will be lowered. In this case, however, the instant film unit having no black opaque paper base or layer must be processed in a darkroom.

Figure 6:
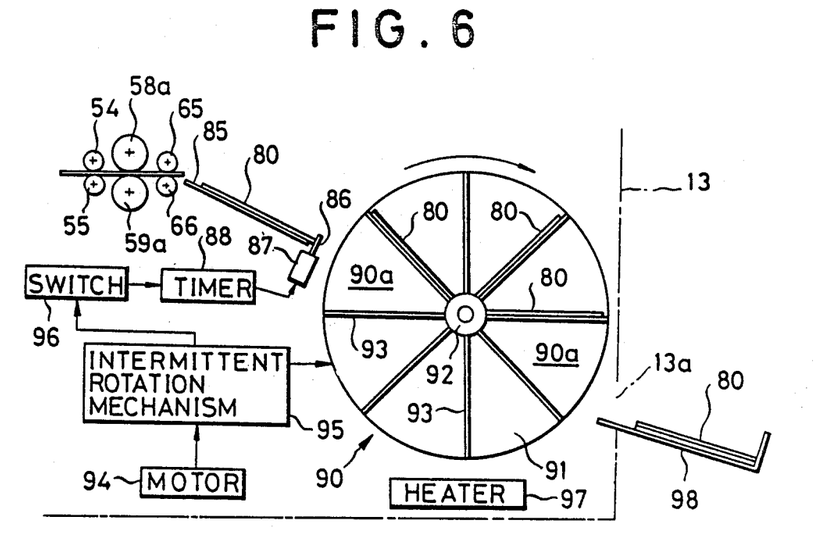
FIG. 6 is a schematic view of a delivery mechanism of instant prints which have been processed inside a camera housing.

In view of the above, there is provided in the camera housing 13 which is adapted to exclude the ambient light, a means for temporarily retaining the instant film unit 80 within the camera housing 13. As shown in FIG. 6, this retaining means comprises an intermittently rotatable wheel 90, resembling a water wheel. Downstream of the withdrawing rollers 65, 66 there is disposed an inclined chute 85 which has a detent 86 secured to a solenoid 87 at the exit end. The detent 86 retracts to allow the instant film unit 80 in the chute 85 to slide down when the solenoid 87 is energized. The solenoid 87 is controlled by a timer 88 to be kept energized for the period of time required for the instant film unit 80 to slide out of the chute 85.

The rotatable wheel 90 comprises side walls 91 fixedly mounted on a shaft 92 and spaced from each other by a plurality of partition walls 93, so as to provide, for example, eight compartments 90a. The shaft 92 is connected to a motor 94 through an intermittent motion mechanism 95 which turns the shaft 92 intermittently one-eighth revolution every fifteen seconds, for example. Each intermittent movement of the intermittent drive mechanism is detected by means of a switch 96, which actuates the timer 88 simultaneously with the rotation of the wheel 90 so as to keep the solenoid energized for a predetermined period of time until the wheel 90 is stopped. For simplicity of the mechanism, it may be desirable to replace the motor 94 with a pulse motor which is driven with intermittent pulses. This replacement permits the intermittent drive mechanism to be omitted.

As instant film unit 80 leaving the wheel 90 is received in a tray 98 through an exit 13a formed in the camera housing. For preventing the ambient light from entering the camera housing through the exit 13a, it is desirable to cover the exit 13a with a flexible opaque flap (not shown).

Beneath the holding wheel 90 there is a heater 97 with an automatic temperature controller so as to keep the temperature in the holding wheel constant, for example at 25° C.

In the foregoing embodiment, the holding wheel 90 is adapted to turn by one increment every fifteen seconds and the detent 86 is adapted to retract when the holding wheel 90 is stopped. Therefore, when the detent 86 retracts, an instant film unit 80 leaves the chute 85 and enters the compartment 90a of the holding wheel 90 in registry with the exit end of the chute 85. The instant film unit 80 now in the compartment 90a is heated to a temperature of 25° C. The holding wheel turns a half revolution during 60 seconds, whereupon the instant film unit 80 is delivered into a tray 98.

As will be apparent from the above, because the instant film unit 80 is heated at 25° C. for 60 seconds, the development and fixing proceeds well, so that a print of uniform quality, for example of uniform density, can be obtained. The image-receiving sheet 1a can then be peeled from the photosensitive sheet 9a after 60 seconds or more, that is, after the development and fixing are complete.

Figure 7:
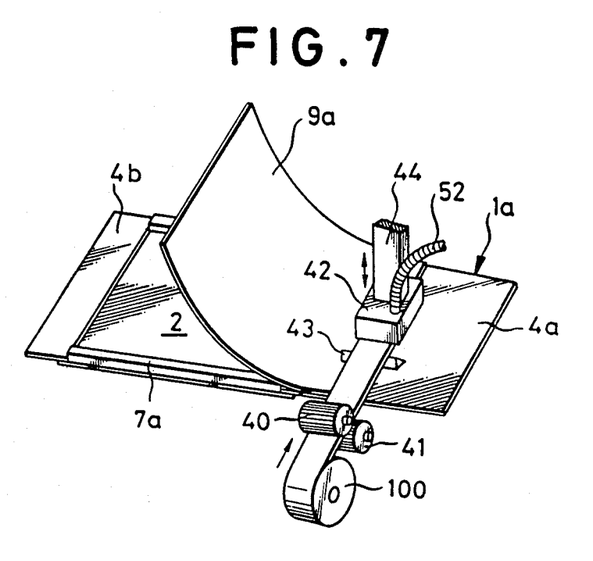
FIG. 7 is a perspective view showing the essential part of an adhesive tape application device in which the adhesive tape is fed in a direction perpendicular to the longitudinal direction of the instant photograph unit.

Reference is not had to FIG. 7 showing another example of the adhesive tape application device, in which the adhesive tape is withdrawn in a direction perpendicular to the longitudinal direction of the photosensitive and image-receiving members. In this example, parts similar to those in FIG. 4 are designated by the same numerals and symbols. According to this example, a narrow adhesive tape 100 can be used.

Figure 8:
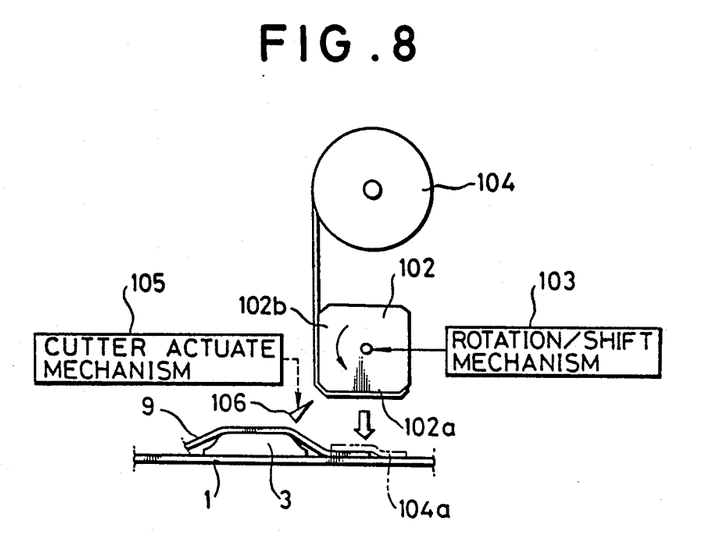
FIGS. 8 to 10 are schematic views showing variations of the adhesive tape application device.

FIG. 8 shows still another example of the adhesive tape application device, in which a parallelepipedal suction box 102 provided with a large number of suction holes on its outer surface is employed. The suction box 102 is adapted to descend after having been turned one-fourth revolution. Specifically, the pressure inside the holding surface 102a of the suction box 102 is made negative to hold the forepart of an adhesive tape 104 by suction. The suction box 102 is then turned one-fourth revolution whilst keeping the forepart held. Consequently, a part of the adhesive tape adjacent to the forepart is brought into contact with the holding surface. At this time a cutter 106 is actuated to move toward a corner of the suction box 102 so as to cut off the forepart of the adhesive tape 104. The suction box 102 continuously moves down until the cut-off portion of tape 104 is pressed against the superposed photosensitive and image-receiving members 9, 1. During the downward movement of the suction box 102, the holding surface 102b has no suction effect so that the adjacent part of the adhesive tape 104 does not move downward with the suction box 102. When the suction box 102 moves back up to its initial position, then the holding surface 102b is caused to have suction effect, so as to hold said adjacent part of the adhesive tape 104. After this, the same sequence is repeated.

Figure 9:
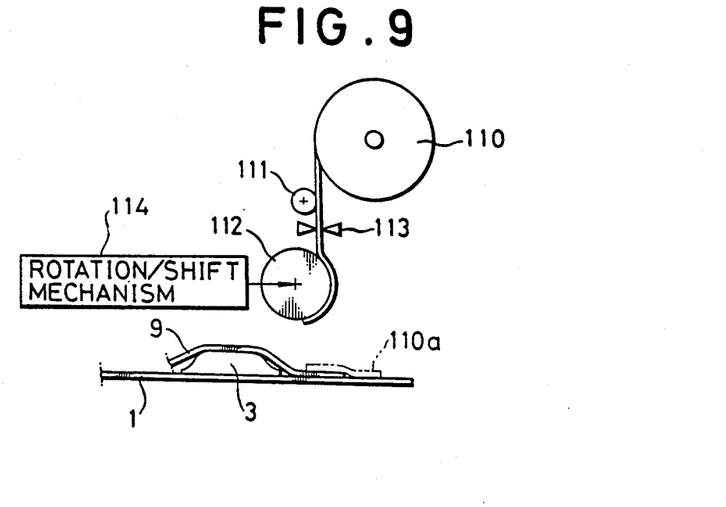

FIG. 9 shows a further example of the adhesive tape applying device, in which a rotatable suction drum is employed. The adhesive tape 110 is withdrawn from the roll means by a rotary suction roller 111 so as to move the forepart of the tape 110 toward the outer surface of a suction drum 112. When a certain length of the adhesive tape 110 has been withdrawn, the pressure inside the suction drum 112 is made negative to hold the forepart of the adhesive tape 110 therearound, and then the cutter 113 is actuated to cut off an adhesive tape piece 110a. The suction drum 112 is then controlled by a rotation-shift mechanism 114 in such a way that suction drum 112 moves downwardly to press the adhesive tape piece 110a against the photosensitive member 9 and then moves forwardly, that is, to be the right in FIG. 9, while rotating, so as to apply the adhesive tape piece 110a in bridging relation between the photosensitive and image-receiving members 9, 1.

Figure 10:
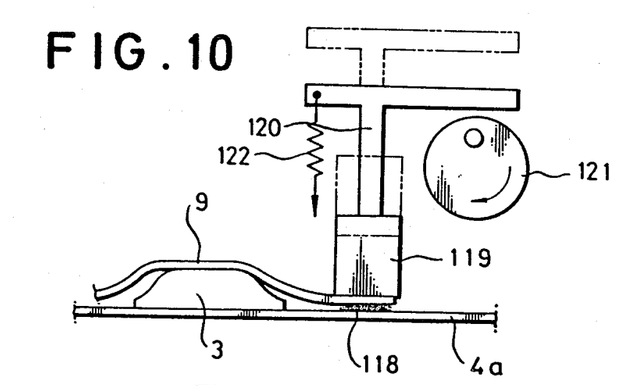

FIG. 10 shows a bonding device for bonding the forward end of the photosensitive member to a part of the image-receiving member by using a boding agent. The withdrawn section 4a of the coupling sheet 4 has a bonding agent layer 118 with a certain width which has been previously provided thereon. On the bonding agent layer 118, the forward end of the photosensitive member 1 is superposed and then pressed by means of a heat sealer 119 for quick bonding. The heat sealer 119, which is, as is well known, provided with a heater therein, is connected to a T-shaped sliding lever 120. The vertical sliding movement of the sliding lever 120 is caused by rotation of an eccentric cam member 121 which is adapted to make one revolution per bond. After bonding, the cam member 121 moves the sliding lever 120 upwardly against the action of a spring 122. It will be evident that the heat sealer 119, which is of the vertically reciprocating type, may be replaced with a rotary pressing heat sealer.

Figure 11:
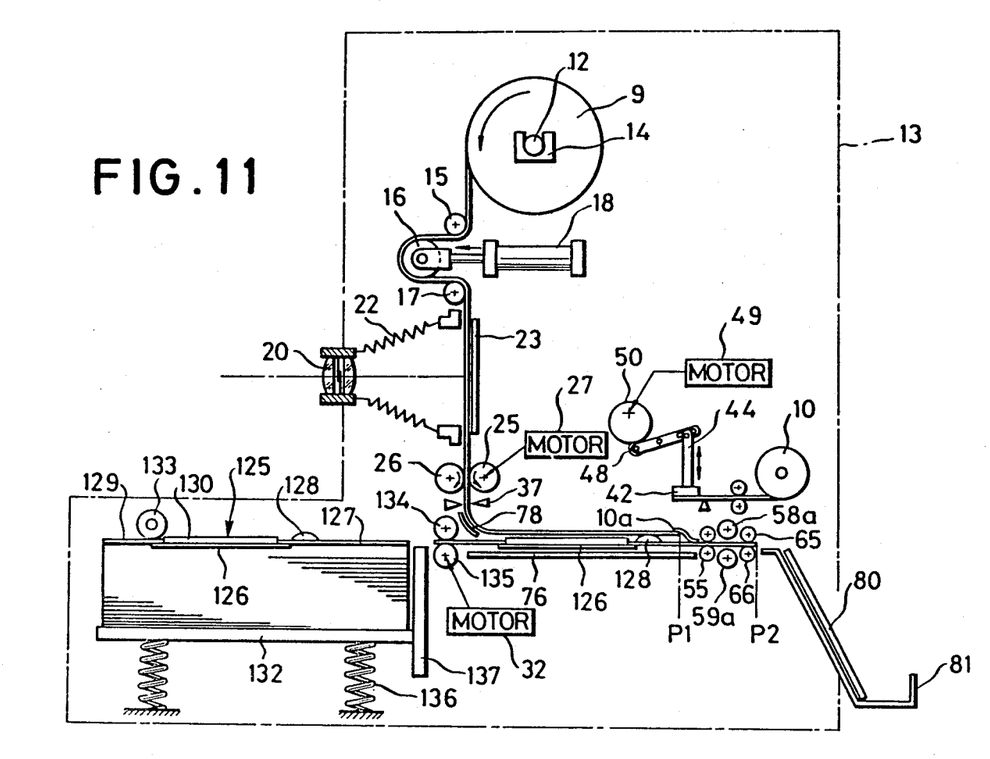
FIG. 11 is a schematic sectional view of another embodiment of the instant photographic apparatus according to the present invention in which image-receiving members in the form of sheets are used.

Reference is now had to FIG. 11, wherein is shown another embodiment of the instant photographic apparatus in accordance with the present invention, in which image-receiving members in the form of sheets are used. The image-receiving sheet member used in this embodiment has the same parts as in the image-receiving member shown in FIG. 4, these same parts being designated by the same numerals. The image-receiving sheet member 125 comprises an image-receiving sheet 126, a withdrawing section 127 having a pod 128 of processing liquid attached thereon, a skirt section 129 connected to the end of the image-receiving sheet 126, and masking members 130 bonded on the both longitudinal sides of the image-receiving sheet 126. It is similar to the image-receiving sheet member 1a cut off along the line 8 from the web-like image-receiving member 1 shown in FIG. 2.

In this embodiment, there is provided in the camera housing 13 a pressure plate 132 on which the image-receiving sheet members 125 are placed in a stack. Above the pressure plate 132 there is a rotary suction drum 133 provided with a large number of suction holes on its outer surface, which is driven by means of a motor through a one-revolution clutch (not shown) to make one turn at a time. The suction drum 133 is caused to rotate, while attaching the top image-receiving sheet member 125 by its skirt section 129, to separate it from the next one in the stack and to feed the attracted image-receiving sheet member 125 until the leading end thereof is nipped between a pair of forwarding rollers 134, 135. The forwarding rollers 134, 135 are controlled to rotate continuously until the leading end of the image-receiving sheet member 125 reaches the second detection position P2.

The pressure plate 132 is biased upwardly by, for example, coil springs 136 to press the top image-receiving sheet member 125 against the suction drum 133. In this position, the leading end of the foremost image-receiving sheet member 125 is disposed slightly higher than the top of a blocking plate 137.

This apparatus, except for the mechanism for feeding the image-receiving sheet members 125 one by one and the location of the cutter 37 which is below the forwarding rollers 25, 26 for the photosensitive sheet, is substantially the same as the apparatus of FIG. 4. Therefore, the general description of the operation of the apparatus can be omitted.

Figure 12:
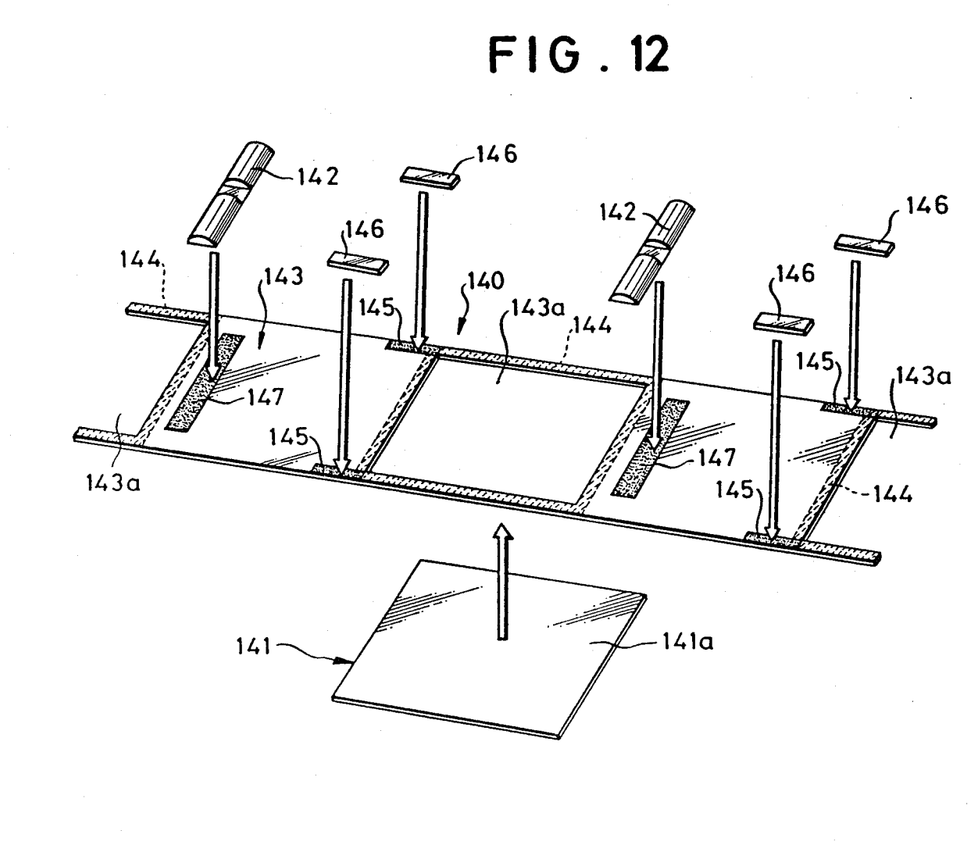
FIG. 12 is an exploded perspective view of another type of image-receiving member used in the present invention.
Figure 13:
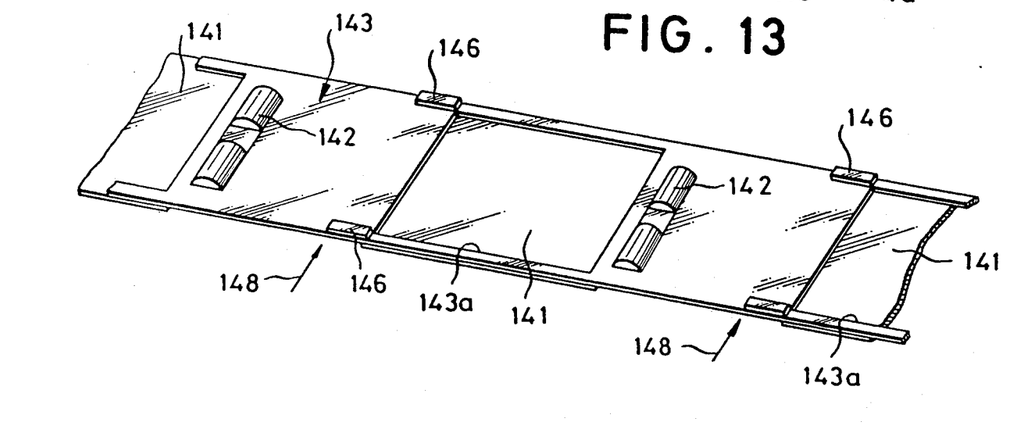
FIG. 13 is a perspective view of the image-receiving member of FIG. 12.

FIGS. 12 and 13 show another example of the image-receiving member for use in the apparatus shown in FIG. 4, which comprises image-receiving sheets 141, each with an image-forming layer 141a and a web-base 143 to which are secured pods 142 of the processing liquid.

The web-like base is formed with a plurality of openings 143a at regular intervals defining both an image area and the thickness to which the processing liquid layer is spread. The web-like base 143 is further provided, surrounding the openings 143a on its back side, with adhesive material layers 144 having a weak bonding strength, by which the image-receiving sheets 141 are connected to, but easily separable from the web-like base 143 upon heating.

Adjacent to the opening 143a, the web-like base 143 is provided on the margin of the front side thereof with a pair of spacer members 146 which serve as a trap for the excess of processing liquid from the image area so as to prevent the escape of the excess processing liquid from the base. Adhesive material layers 147 are provided for retaining the pods 142 of processing liquid. The image-receiving member 140 described above is cut off along the line shown by the arrow 148 by the cutter 36 of FIG. 4 to provide a single frame of image-receiving member.

Although in the foregoing embodiment the pods of processing liquid have been previously attached to the image-receiving member or the image-receiving sheet members, it is possible either to attach the pod to the member immediately before the member is forwarded from its loaded position, or to apply a processing liquid between the photosensitive and image-receiving members immediately before the superposition thereof.

The invention has been described with particular reference to preferred illustrative embodiments thereof, but it will be understood that variations and modifications can be effected within the spirit and scope of the invention.

What is claimed is:

1. An instant photographic apparatus, comprising:
    means for supporting an elongated photosensitive member in the form of a roll;
    exposure means for creating a latent image on an end of said photosensitive member disposed in an exposure position;
    means for advancing said photosensitive member by a predetermined increment of length after exposure;
    means for supporting an image-receiving member on which a positive image is adapted to be formed corresponding to said latent image on said photosensitive member during processing by means of diffusion transfer;
    means for advancing said image-receiving member a predetermined distance after the exposure of said photosensitive member;
    means for superposing the exposed portion of said photosensitive member and said image-receiving member;
    means for releasably adhesively connecting said members together;
    means for thereafter spreading a processing liquid between said members; and
    means for cutting off at least said exposed photosensitive member to provide a single frame comprised by a pair of superposed sheets comprising said photosensitive and image-receiving members, prior to the spreading of said processing liquid.

2. Apparatus as claimed in claim 1, said releasably adhesively connecting means comprising means for interconnecting said exposed photosensitive member at its leading end to a leading portion of said image-receiving member after superposition of said members.

3. Apparatus as claimed in claim 2, said connecting means comprising means to apply a length of adhesive tape to both of said superposed members.

4. Apparatus as claimed in claim 3, said means to apply a length of adhesive tape comprising a pair of wheels for gripping and withdrawing adhesive tape from a roll of adhesive tape, a push plate adapted to hold the withdrawn tape by suction and to move downwardly to apply the tape to both said members, and a cutter for cutting off the end of the tape held by the plate during movement of the plate toward said members.

5. Apparatus as claimed in claim 2, said interconnecting means comprising a heat sealer for melting an adhesive material layer between said members, said heat sealer being adapted to press said members together with said adhesive material between them.

6. Apparatus as claimed in claim 1, and means for partially retracting said photosensitive member after the operation of said cutting off means thereby to move the cut-off end of said photosensitive member closer to said exposure position.

7. Apparatus as claimed in claim 1, said image-receiving member being in the form of a sheet, there being a plurality of said sheets in a stack in said apparatus, said means for advancing said image-receiving member comprising means for advancing said sheets one by one, and said cutting off means acting to cut off only said photosensitive member.

8. Apparatus as claimed in claim 1, said image-receiving member being in the form of an elongated strip disposed in a roll in said apparatus, said cutting off means cutting off both said photosensitive and said image-receiving members.

9. Apparatus as claimed in claim 1, and means within the apparatus defining a plurality of compartments adapted to rotate intermittently so as to receive successively in each compartment a pair of superposed photosensitive and image-receiving members and hold said pair therein during rotation through a predetermined angle and thereafter to deliver said superposed members outside the apparatus after said diffusion transfer.

10. Apparatus as claimed in claim 9, and a heater for heating said plurality of compartments.

11. Photographic apparatus comprising:
means for providing a photosensitive member which is a strip in the form of a roll of a length to receive a plurality of exposures;
means for providing an image-receiving sheet separate and spaced from said photosensitive member, on which a positive image is adapted to be formed corresponding to a latent image on said photosensitive member;
means for withdrawing an end of said strip from said roll;
means for exposing said withdrawn end to a photographic image so as to form a latent image;
means for cutting said end from said strip to a predetermined length to provide a cut-off portion bearing said latent image;
means for moving the cut-off portion of said photosensitive member and said image-receiving member toward each other and into superposed relation;
means for releasably adhesively connecting said members together; and
means for thereafter spreading a processing liquid between said latent image and said image-receiving member so as to form a positive image of said latent image on said image-receiving member by diffusion transfer.

12. Apparatus as claimed in claim 11, said releasably adhesively connecting means comprising means for interconnecting said exposed photosensitive member at its leading end to a leading portion of said image-receiving member after superposition of said members.

13. Apparatus as claimed in claim 12, said connecting means comprising means to apply a length of adhesive tape to both of said superposed members.

14. Apparatus as claimed in claim 13, said means to apply a length of adhesive tape comprising a pair of wheels for gripping and withdrawing adhesive tape from a roll of adhesive tape, a push plate adapted to hold the withdrawn tape by suction and to move downwardly to apply the tape to both said members, and a cutter for cutting off the end of the tape held by the plate during movement of the plate toward said members.

15. Apparatus as claimed in claim 12, said interconnecting means comprising a heat sealer for melting an adhesive material layer between said members, said heat sealer being adapted to press said members together with said adhesive material between them.

16. An instant photographic apparatus, comprising:
means for supporting an elongated photosensitive member in the form of a roll;
exposure means for creating a latent image on an end of said photosensitive member disposed in an exposure position;
means for advancing said photosensitive member by a predetermined increment of length after exposure;
means for supporting an image-receiving member on which a positive image is adapted to be formed corresponding to said latent image on said photosensitive member during processing by means of diffusion transfer;
means for advancing said image-receiving member a predetermined distance after the exposure of said photosensitive member;
means for superposing the exposed portion of said photosensitive member and said image-receiving member whilst spreading a processing liquid therebetween;
means for cutting off at least said exposed photosensitive member to provide a single frame comprised by a pair of superposed sheets comprising said photosensitive and image-receiving members, prior to the spreading of said processing liquid; and
means within the apparatus defining a plurality of compartments adapted to rotate intermittently so as to receive successively in each compartment a pair of superposed photosensitive and image-receiving members and hold said pair therein during rotation through a predetermined angle and thereafter to deliver said superposed members outside the apparatus after said diffusion transfer.

17. Apparatus as claimed in claim 16, and a heater for heating said plurality of compartments.

18. Photographic apparatus comprising:
means for providing a photosensitive member which is a strip in the form of a roll of a length to receive a plurality of exposures;
means for providing an image-receiving sheet separate and spaced from said photosensitive member, on which a positive image is adapted to be formed corresponding to a latent image on said photosensitive member;
means for withdrawing an end of said strip from said roll;
means for exposing said withdrawn end to a photographic image so as to form a latent image;
means for cutting said end from said strip to a predetermined length to provide a cut-off portion bearing said latent image;

means for moving the cut-off portion of said photosensitive member and said image-receiving member toward each other and into superposed relation and spreading a processing liquid between said latent image and said image-receiving member so as to form a positive image of said latent image on said image-receiving member by diffusion transfer; and means within the apparatus defining a plurality of compartments adapted to rotate intermittently so as to receive successively in each compartment a pair of superposed photosensitive and image-receiving members and hold said pair therein during rotation through a predetermined angle and thereafter to deliver said superposed members outside the apparatus after said diffusion transfer.

19. Apparatus as claimed in claim 18, and a heater for heating said plurality of compartments.

* * * * *